3,839,582
CONTROL OF HELMINTHS WITH 4-ISOTHIO-CYANO-DIPHENYLAMINES
Paul Brenneisen, Basel, Jean-Jacques Gallay, Magden, and Alfred Margot, Basel, Switzerland, assignors to Ciba-Geigy Corporation, Ardsley, N.Y.
No Drawing. Original application July 7, 1969, Ser. No. 839,653, now Patent No. 3,755,406. Divided and this application May 22, 1973, Ser. No. 362,702
Int. Cl. A61k 27/00
U.S. Cl. 424—302   5 Claims

ABSTRACT OF THE DISCLOSURE

Isothiocyano-diphenylamines of the formula

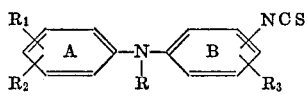

wherein the ortho positions, in rings A and B, relative to an —NH— bridge are free from isothiocyano substituents, R represents hydrogen, alkyl of at most 3 carbon atoms or alkenyl of at most 3 carbon atoms, $R_1$ and $R_3$ represent, independently of each other hydrogen, middle halogen, cyano, hydroxy, nitro, carboxy, trifluoromethyl, alkyl, alkenyl, alkoxy, alkenyloxy, alkylthio, alkenylthio, each of the latter six groups having at most 5 carbon atoms, alkanoylamino, alkanoyl, alkanoyloxy, alkoxycarbonyl, each of the four last-mentioned groups having at most 6 carbon atoms, dialkylamino having a total of at most 5 carbon atoms, a group

or a group

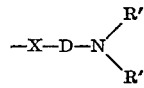

wherein D is alkylene of 2 or 3 carbon atoms, R' represents alkyl of 1 to 3 carbon atoms, the sum of the carbon atoms of D and R' not exceeding 6, and X represents oxygen or sulfur and $R_2$ represents hydrogen, halogen, nitro, isothiocyano or alkyl of at most 5 carbon atoms, and wherein an isothiocyano group must be in m- or p-position to any hydroxy or carboxy being a substituent of a benzene ring or to the —NR— bridge when R is hydrogen, and, when R, $R_1$ and $R_3$ are hydrogen atoms, the group —NCS at ring B is in m- or p-position and any isothiocyano group $R_2$ is in m-position, are disclosed as anthelmintic agents. Their production their use in the control of helminths and compositions containing them are also disclosed. Particularly useful are 4-nitro-, 4-chloro-, and 4-methyl-4'-isothiocyano-diphenylamines.

DESCRIPTION OF THE INVENTION

This is a division of application Ser. No. 839,653, filed on July 7, 1969 now U.S. Pat. No. 3,755,406.

The present invention concerns new isothiocyano-diphenylamines and processes for the production of these new compounds, as well as the use of the new compounds for the control of parasitic helminths.

Among endoparasites which occur in warm-blooded animals, helminths are those which cause the greatest damage. Thus animals attacked by them, for example, not only show retarded growth, but often injuries occur which can result in the death of the animals. It is, therefore, of great importance to develop agents which are suitable for combating helminths in all stages of their development and for preventing infestation by these parasites. Although there are a number of substances known having anthelmintic properties, they are often not wholly satisfactory, be it that their action is insufficient when applied in toxicologically tolerable doses, or that when applied in therapeutically effective doses undesirable side effects appear, or that they show only a very specific range of action.

In the present description, the term "helminths" refers to nematodes, cestodes and trematodes, i.e. to worms which infest the gastrointestinal tract, the liver and other organs.

The novel anthelmintically active isothiocyano-diphenylmines correspond to the Formula I

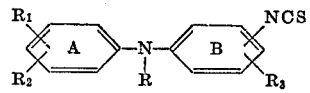 (I)

wherein the ortho positions, in rings A and B, relative to an —NH— bridge are free from isothiocyano substituents, R represents hydrogen, alkyl of at most 3 carbon atoms or alkenyl of at most 3 carbon atoms, $R_1$ and $R_3$ represent, independently of each other hydrogen, middle halogen, cyano, hydroxy, nitro, carboxy, trifluoromethyl, alkyl, alkenyl, alkoxy, alkenyloxy, alkylthio, alkenylthio, each of the latter six groups having at most 5 carbon atoms, alkanoylamino, alkanoyl, alkanoyloxy, alkoxycarbonyl, each of the four last-mentioned groups having at most 6 carbon atoms, dialkylamino having a total of at most 5 carbon atoms, a group

or a group

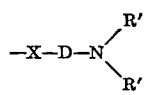

wherein D is alkylene of 2 or 3 carbon atoms, R' represents alkyl of 1 to 3 carbon atoms, the sum of the carbon atoms of D and R' not exceeding 6, and X represents oxygen or sulfur, and $R_2$ represents hydrogen, halogen, nitro, isothiocyano or alkyl of at most 5 carbon atoms, and wherein an isothiocyano group must be in m- or p-position to any hydroxy or carboxy being a substituent of a benzene ring or to the —NR— bridge when R is hydrogen, and when R, $R_1$ and $R_3$ are hydrogen atoms, the group —NCS at ring B is in m- or p-position and any isothiocyano group $R_2$ is in m-position.

As alkyl and alkenyl radicals, $R_1$ and $R_3$ in the above formula are meant straight chain or branched chain radicals, for example the following: methyl, ethyl, n-propyl, isopropyl, n-butyl, iso-butyl, tert-butyl, sec-butyl and pentyl radicals, as well as allyl, methally, propenyl, isopropenyl and butenyl radicals, and dialkylamino radicals $R_1$ and $R_3$ have, in straight chains, 1 to 5 and in branched chains 3 to 5 carbon atoms. Alkenyloxy radicals $R_1$ and $R_3$ have in straight chains 2 to 5 and in in branched chains 3 to 5 cabon atoms.

As alkanoyl radicals $R_1$ and $R_3$ are for example the following: the formyl, acetyl, propionyl, butyryl, valeryl, isobutyryl and isovaleryl radicals. Such alkanoyl radicals preferably also form the alkanoyl radical of an alkanoylamino group. In an alkoxycarbonyl radical, the alkoxy moiety has at most 5 carbon atoms in a straight or branched chain. Halogen represents chlorine and bromine.

Compounds of the formula I wherein R represents hydrogen $R_1$ represents hydrogen, halogen, nitro, alkoxy of at most 5, in particular 1 or 2 carbon atoms or alkylthio with at most 5, in particular 1 or 2, carbon atoms, $R_2$ represents hydrogen, alkyl of at most 5, in particular 1 or 2, carbon atoms or isothiocyano, and $R_3$ represents hydrogen alkyl of at most 5, in particular 1 or 2 carbon atoms, carboxy, alkoxy carbonyl with at most 5, in particular 2 or 3 carbon atoms are preferred compounds, and wherein an isothiocyano group must be in m- or p-position to the —NR— bridge when R is hydrogen.

The isothiocyano-diphenylamines of Formula I are produced according to the invention by reacting an aminodiphenylamine of the Formula II:

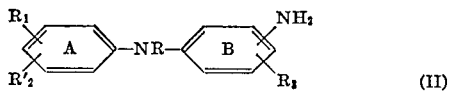

(II)

wherein $R'_2$ represents hydrogen, halogen, nitro, amino or an alkyl radical with at most 5 carbon atoms, R, $R_1$ and $R_3$ have the meanings given for Formula I, and wherein a primaryl amino group being in m- or p-position to hydroxy, carboxy or to the —NR— bridge when R is hydrogen, and only in those cases where $R_1$ and/or $R_3$ represent a substituent other than hydrogen the —$NH_2$ group at ring B as well as any —$NH_2$ group $R'_2$ can be in para-position to the —NR— bridge when R is hydrogen, with (a) a thiocarbonic acid derivative of the formula:

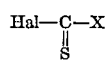

wherein
Hal represents chlorine or bromine and
Y represents chlorine, bromine or a dialkylamino group, or (b) sulfides of the formula:

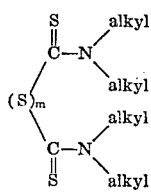

wherein
alkyl represents a lower alkyl radical having at most 4 carbon atoms, and
m represents the integer 1 or 2, or (c) pentathio - dipercarbonic acid-bis-(trihalogenoalkyl) esters.

The processes are preferably performed in the presence of solvents or diluents which are inert towards the reaction components.

For the process according to the invention, as thiocarbonic acid derivatives mentioned under (a), either thiophosgene, optionally in the presence of an acid-binding agent and at temperatures ranging between 0 and 75° C., or N,N-diethylthiocarbamoyl chloride at temperatures between 40 and 200° C. are used.

The thiocarbonyl group is introduced by known methods: reactions of amines with thiophosgene (a) are described in Houben-Weyl 4th Ed., Vol. 9, page 867 (1955); the use of acid-binding agents is described by O. E. Schultz in Arch. Pharm. 295, 146–151 (1962); the reaction of amines with N,N-diethylthiocarbamoyl chloride (a) is described in the Journal org. Chem. 30, 2465 (1965), with bis-thiocarbamoyl sulfides (b) by F. H. Marquardt in Helv. chim. Acta 49, 1716 (1966), and those with pentathio-dipercarbonic acid-bis-(trihalogenoalkyl) esters (c) by R. Gottfried in Angew. Chemie 78, 985 (1966).

The new isothiocyano-diphenylamines of Formula I, wherein $R_1$, $R_2$ and $R_3$ have the meanings given for Formula I, with the exception that nitro, carboxy and trifluoromethyl must be at a ring not bearing an amino group, are also obtained by reacting a diphenylamine of Formula II, in which $R_1$, $R'_2$ and $R_3$ have the meanings given for Formula II with the exception that nitro, carboxy and trifluoromethyl must be at a ring not bearing an amino group.

(d) with ammonium thiocyanate in the presence of excess hydrogen chloride in a solvent which is inert towards the reaction components, preferably in an aromatic hydrocarbon or halohydrocrabon;
(e) with benzoyl isothiocyanate into the corresponding thiourea and this is then decomposed by heating, in the presence of a solvent which is inert towards the reaction components, preferably in an aromatic hydrocarbon or halohydrocarbon, or in the presence of acids or acid anhydrides;
(f) with carbon disulfide in the presence of an inorganic base or a tertiary amine into the corresponding dithiocarbamic acid salts and then splitting off the mercapto moiety therefrom.

For the reactions mentioned under (d) and (e), chlorobenzene is preferably used as solvent, other suitable solvents are, however, also dichlorobenzene, toluene, xylenes, cumene, etc. Process (d) is performed according to British Pat. No. 1,099,768, by saturating the solution of the diphenylamine with hydrogen chloride gas, then adding the ammonium thiocyanate and refluxing for several hours under continual introduction of hydrogen chloride. The thermal decomposition of thioureas (e) is performed in the manner described by J. N. Baxter et al. in J. Chem. Soc. (1956), page 659 ff. The thioureas are produced according to Org. Synthesis III 735 (1955). As inorganic bases for the production of dithiocarbamic acid salts (f), for example, the hydroxides, oxides and carbonates of alkali metals and alkaline earth metals as well as ammonium hydroxide are used; as tertiary amines, for example, trialkyl amines, pyridine bases, etc., are used. The stripping off of the mercapto moiety can be performed oxidatively with metal salts (British Pat. No. 793,802; Dutch Pat. No. 81,326), e.g. with lead, copper, zinc or iron-(III) salts, iodine, alkali metal hypochlorites or chlorites, preferably those of potassium and sodium (French Pat. No. 1,311,855), furthermore, with suitable acid halides such as phosgene and phosphoroxy chloride [D. Martin et al., Chem. Ber. *98*, 2425–2426 (1965)], as well as with elementary chlorine and ammonium sulfide (German specification open to public inspection No. 1,192,189) or Chloramine T (British Pat. No. 1,024,913).

New isothiocyano-diphenyl amines of the more specific Formula III:

$$(R_4-Y)_n-A-NR-B-NCS \quad R_5 \quad R_6 \qquad (III)$$

wherein

R represents hydrogen or alkyl of at most 3 carbon atoms or alkenyl of at most 3 carbon atoms,
$R_4$ represents alkyl of at most 5 carbon atoms or alkenyl radical of at most 5 carbon atoms, dialkylaminoalkyl of at most 6 carbon atoms,
Y represents oxygen or sulfur,
$n$ represents zero or 1,
$R_5$ represents hydrogen, isothiocyano, halogen, nitro, trifluoromethyl, alkyl of at most 5 carbon atoms or alkenyl of at most 5 carbon atoms,
$R_6$ represents hydrogen, halogen, nitro, trifluoromethyl, alkyl of at most 5 carbon atoms or alkenyl of at most 5 carbon atoms, or the group $Y-R_4$ wherein Y and $R_4$ have the meanings given above, the —NCS group at ring B and any isothiocyano group $R_5$ being in m- or p-position in case R represents hydrogen, and in those cases where $n$ represents zero, $R_6$ represents the group $Y-R_4$, are obtained according to another modification of the process according to the invention by reacting an isothiocyano-diphenyl amine of Formula IV:

$$(H-Y)_n-A-NH-B-NCS \quad R_5 \quad R'_6 \qquad (IV)$$

wherein $R'_6$ represents hydrogen, halogen, nitro, trifluoromethyl, alkyl of at most 5 carbon atoms or alkenyl of at most 5 carbon atoms or the group —Y—H, wherein Y represents oxygen or sulfur, the —NCS group at ring B and any isothiocyano group $R_5$ being in m- or p-position in case R represents hydrogen and any isothiocyano group $R_5$ being in m- or p-position to a Y—H-group, and in those cases where $n$ represents zero, $R'_6$ represents the group —Y—H, and R and $R_5$ are as defined above,
with a compound of Formula V:

$$R_4-Z \qquad (V)$$

wherein $R_4$ has the meanings given for Formula III, and
Z represents chlorine, bromine or iodine, in stoichiometrical amounts, calculated on hydroxyl and/or mercapto groups. For the production of compounds of Formula III in which $R_4$ represents an alkyl radical, instead of a compound of Formula V, a dialkyl sulfate can also be employed. The performance of this modification of the process is carried out in the manner described in German Pat. No. 852,087.

The starting amino-diphenylamines of Formula II wherein R represents an alkyl or alkenyl radical with at most 3 carbon atoms are obtained by reacting a nitro-diphenylamine of Formula VI $$R_1-\underset{R_2}{\bigcirc}-NH-\underset{R_3}{\bigcirc}-NO_2 \qquad (VI)$$

wherein $R_1$, $R_2$ and $R_3$ are as defined under Formula I, preferably in the presence of an acid binding agent and of a solvent inert towards the reactants, with a compound of Formula VII $$R-E \qquad (VII)$$

wherein

R has the meaning given above and
E represents a halogen atom or an alkoxysulfonyloxy- or arylsulfonyloxy-group and reducing by methods known per se the so obtained N-alkyl- or N-alkenyl-nitrodiphenylamine to the N-alkyl- or N-alkenyl-nitrodiphenylamines, for instance, not only by means of molecular hydrogen, but also by means of nascent hydrogen, formed, e.g. in a solution or suspension of the nitro-diphenylamine. Moreover, the reaction may be performed also by means of hydrogenation catalysts, such as e.g. Raney-nickel, and Raney-cobalt. Nitro-diphenylamines of Formula VI are in part known and in part new compounds. As far as they are new, they may be prepared according to Houben-Weyl 11/I, p. 242 or F. Ullmann, Ber. *41*, 3744–3755 (1908).

The novel isothiocyano-diphenylamines of Formula I wherein one of the symbols $R_1$ and $R_3$ represent a tertiary amino group can be converted into the corresponding salts with acids that are non-toxic for human and animal organisms. Suitable acids are inorganic and organic acids such as, for example, hydrohalic acids, sulfuric acid, phosphoric acids, acetic acid, aminoacetic acid, butyric acid, lauric acid, stearic acid, oxalic acid, adipic acid, maleic acid, tartaric acid, lactic acid, methane sulfonic acid and p-toluene sulfonic acid, or for the production of quaternary salts and they can be converted with the usual quaternizing agents such as alkyl halides, dialkyl sulfates, toluene sulfonic acid esters, etc., into the corresponding quaternary ammonium salts. If the anion of the quaternary salt is toxic for the animal organism, it can be exchanged for a non-toxic anion by reacting with a non-toxic acid.

The amines serving as starting materials can be employed in the form of the free bases and also as acid addition salts, especially those from mineral acids. Examples of suitable inert, organic solvents that can be employed in the process according to the invention are the following: aliphatic or aromatic hydrocarbons, aliphatic and aromatic halohydrocarbons, ether and ether-type compounds, water or mixtures of such solvents with water.

The isothiocyano-diphenylamines according to the invention, and their salts, including the quaternary salts, possess decided anthelmintic properties. The new active substances are especially suited for combating parasitic— nematodes: such as ascaridae, trichostrongylidae, strongylidae, ancylostomatidae;
cestodes: such as taeniidae, anoplocephalidae;
trematodes: such as fasciolidae;

in pets and domestic animals such as cattle, sheep, goats, horses, pigs, cats, dogs and poultry.

The active substances can be administered to helminth-infested animals or to animals to be protected against helminths in the form of therapeutical preparations either as one single dose or repeatedly, the single dosage, depending on the type of animal, preferably between 25 and 1000 mg. per kg. bodyweight.

In some cases better results are obtained or the total amount required for a cure can be decreased by protracted administration. The concentration in which the active substances in the form of such agents are added, e.g. to feeds or liquids given to animals are between 0.05 and 1% by weight.

The novel isothiocyano-diphenylamines and their salts which are non-toxic for the organism, can be administered to the animals perorally or via the abomasum in the form of solutions, emulsions, suspensions (drenches), powders, tablets, boluses and capsules.

To prepare the forms of application listed above, conventional solid carriers can be used such as kaolin, talcum, bentonite, sodium chloride, calcium phosphate, carbohydrates, cellulose powder, cottonseed meal, carbowaxes, gelatins, or liquids such as water, if desired with the addition of surface active substances such as ionic or non-ionic dispersing agents, and also oils and other solvents which are well tolerated by the animal organism. When the anthelmintic agents are in the form of feed concentrates, carriers which can be used are, for example, formulated foods, grain feeds or protein concentrate. Such feed concentrates can also contain, in addition to the active substances, other additives, e.g. vitamins, antibiotic, chemotherapeutic, bacteriostatic, fungistatic and coccidiostatic substances, hormone preparations, substances having an anabolic activity or other substances which promote growth, influence the quality of the heat of fat stock animals or are useful to the animal organism in other ways.

Some tests to determine the anthelmintic activity of the new isothiocyano-diphenylamines of the general Formula I are described below.

Determination of the anthelmintic action on chickens infested with *Ascaridia galli*

1 to 3 day-old chicks were artifically infested with eggs of Ascaridia galli. Groups of 5 chicks each were used for each test. 4 to 5 weeks after infestation, the active substances were administered to the animals in a single dose per day on 3 consecutive days. Infested chickens that had not been treated served as controls.

Evaluation.—The number of *Ascaridia galli* eliminated by each test group during 5 days after the first administration of the active substance was determined daily and in addition the number of worms still found in the intestine after dissection on the 5th day. Furthermore, the number of chickens free from worms was determined.

The results were evaluated after dissection of the test animals by counting the number of tape worms in the intestines. Untreated mice which had been infested in the same way and at the same time served as controls.

The agents were tolerated by the mice without any symptoms.

| Active substance | Daily dosage, mg./kg. body weight | Infestation of— | |
|---|---|---|---|
| | | The test animals at dissection | The control animals at dissection |
| 3-methyl-4'-isothiocyano-diphenylamine | 500 | 0-0-0-0-0 | 3-3-0-0-1 |
| 4-nitro-4'-isothiocyano-diphenylamine | 750 | 0-0-1-0-0 | 4-5-1-11-2 |
| 4-methyl-4'-isothiocyano-diphenylamine | 750 | 0-0-0-0-0 | 22-41-5-15-21 |
| 2-carboxy-3'-isothiocyano-diphenylamine | 400 | 0-0-0-0-0 | 8-0-23-4-5 |
| 4-chloro-4'-isothiocyano-diphenylamine | 750 | 0-0-0-0-0 | 28-19-16-11-13 |
| 2-carbomethoxy-3'-isothiocyano-diphenylamine | 750 | 0-0-0-0-0 | 9-4-3-6-5 |
| 4-methylthio-3'-isothiocyano-diphenylamine | 750 | 0-0-0-0-0 | 4-6-2-4-7 |
| 4-methylthio-4'-isothiocyano-diphenylamine | 750 | 0-0-0-0-0 | 4-6-2-4-7 |
| 3-chloro-4'-isothiocyano-diphenylamine | 500 | 0-0-0-0-0 | 14-3-21-9-8 |
| 3-nitro-4'-isothiocyano-diphenylamine | 750 | 0-0-0-0-0 | 3-5-4-4 |
| 4-acetamido-3'-isothiocyano-diphenylamine | 750 | 0-0-0-0-0 | 3-5-4-4 |
| 3,4'-bis-isothiocyano-diphenylamine | 750 | 0-0-0-0-0 | 3-5-4-4 |
| N-n-propyl-4-methoxy-4'-isothiocyano-diphenylamine | 750 | 0-0-0-0-0 | 3-4-5-6-9 |
| N-allyl-4-methoxy-4'-isothiocyano-diphenylamine | 750 | 0-0-0-0-2 | 3-4-5-6-9 |
| N-allyl-4-chloro-4'-isothiocyano-diphenylamine | 750 | 0-0-0-0-0 | 3-8-12-16-15 |
| 4-ethyl-4'-isothiocyano-diphenylamine | 250 | 0-0-0-0-0 | 6-12-14-16-22 |
| 3,4-dimethyl-4'-isothiocyano-diphenylamine | 750 | 0-0-0-2-1 | 2-3-5-6-7 |
| 4-methoxy-3'-isothiocyano-diphenylamine | 750 | 0-0-0-0-0 | 14-18-21-27-37 |

Tests on rats infested with *Fasciola hepatica*

White laboratory rats are infested with liver flukes (*Fasciola hepatica*). On completion of the prepatency period, the infestation of the rats by liver flukes is determined by three separate analyses of the faeces.

| | | Number of *Ascaridia galli* from 5 chickens | | | | |
|---|---|---|---|---|---|---|
| | Daily dosage, mg./kg. body weight | Eliminated during the test | | Found at dissection | Number of worm-free chickens | General condition |
| Active substance | | Absolute number | In percent of the total number | | | |
| 4-chloro-2'-carboxy-4'-isothiocyano-diphenylamine | 500 | 41 | 100 | 0 | 5 | Good. |
| 3-methyl-4'-isothiocyano-diphenylamine | 500 | 358 | 100 | 0 | 5 | Do. |
| 4-nitro-4'-isothiocyano-diphenylamine | 500 | 80 | 100 | 0 | 5 | Do. |
| 4-methyl-4'-isothiocyano-diphenylamine | 500 | 72 | 100 | 0 | 5 | Do. |
| 4-tert-butyl-4'-isothiocyano-diphenylamine | 500 | 65 | 100 | 0 | 5 | Do. |
| 4-methyl-3-isothiocyano-diphenylamine | 500 | 199 | 100 | 0 | 5 | Do. |
| 4-hydroxy-4'-isothiocyano-diphenylamine | 500 | 119 | 86 | 19 | 3 | Do. |
| 4-chloro-4'-isothiocyano-diphenylamine | 500 | 37 | 100 | 0 | 5 | Do. |
| 3-isothiocyano-diphenylamine | 500 | 169 | 100 | 0 | 5 | Do. |
| 4-methoxy-4'-isothiocyano-diphenylamine | 500 | 86 | 100 | 0 | 5 | Do. |
| 4-methylthio-4'-isothiocyano-diphenylamine | 750 | 133 | 100 | 0 | 5 | Do. |
| N-ally-4-chloro-4'-isothiocyano-diphenylamine | 750 | 211 | 98 | 4 | 4 | Do. |
| 3,4-dimethyl-4'-isothiocyano-diphenylamine | 750 | 106 | 100 | 0 | 5 | Do. |
| 3-trifluoromethyl-3'-isothiocyano-diphenylamine | 170 | 168 | 98 | 2 | 3 | Do. |
| 4-bromo-4'-isothiocyano-diphenylamine | 750 | 164 | 100 | 0 | 5 | Do. |
| 3-nitro-4'-isothiocyano-diphenylamine | 600 | 104 | 100 | 0 | 5 | Do. |
| 3,4'-diisothiocyano-diphenylamine | 750 | 137 | 100 | 0 | 5 | Do. |

Tests on mice infested with *Hymenolepis nana*

The active substances, in the form of a suspension, were administered via an esophagal syringe to white mice which had been infested with *Hymenolepis nana*. Five animals were used for each test. The active substances were administered once a day to each test animal on 3 consecutive days. The animals were then killed and dissected on the 8th day after the beginning of the treatment.

For each test 2 to 4 infested rats are treated once daily for three consecutive days with the active substance which is applied via an esophagal syringe in the form of a suspension. From the third to the fifth week after administration of the active substance, the faeces are analyzed once a week to determine whether they contain any eggs of liver flukes. At the end of the fifth week of the test, the test animals are killed and examined for the presence of liver flukes.

| Active substance | Daily dosage, mg./kg. of body weight | Examination of faeces for elimination of eggs 3 times | | Number of liver flukes after dissection | General condition |
| --- | --- | --- | --- | --- | --- |
| | | Before medication | After medication | | |
| 2,4-dinitro-4'-isothiocyano-diphenylamine | 200 | Positive | Negative | 0-0 | Good. |
| 3-methyl-4'-isothiocyano-diphenylamine | 50 | do | do | 0-0 | Do. |
| 4-methoxy-2'-carboxy-5'-isothiocyano-diphenylamine | 200 | do | do | 0-0 | Do. |
| 4-nitro-4'-isothiocyano-diphenylamine | 200 | do | do | 0-0 | Do. |
| 4-acetylamino-4'-isothiocyano-diphenylamine | 50 | do | do | 0-0 | Do. |
| 4-methyl-4'-isothiocyano-diphenylamine | 200 | do | do | 0-0 | Do. |
| 2-carboxy-3'-isothiocyano-diphenylamine | 100 | do | do | 0-0 | Do. |
| 2-carboxy-4'-isothiocyano-diphenylamine | 50 | do | do | 0-0 | Do. |
| 4-chloro-4'-isothiocyano-diphenylamine | 100 | do | do | 0-0-0-1 | Do. |
| 2-carboxy-3'-isothiocyano-diphenylamine | 100 | do | do | 0-0-0-0 | Do. |
| 2-carbomethoxy-3'-isothiocyano-diphenylamine | 200 | do | do | 0-0-0-0 | Do. |
| 4-methylthio-4'-isothiocyano-diphenylamine | 150 | do | do | 0 0 0 0 | Do. |
| N-allyl-4-chloro-4'-isothiocyano-diphenylamine | 200 | do | do | 0-0-0-2 | Do. |
| N-allyl-4-methyl-4'-isothiocyano-diphenylamine | 50 | do | do | 0-0-0-0 | Do. |
| N-n-propyl-3-methoxy-4'-isothiocyano-diphenylamine | 200 | do | do | 0-0-0-0 | Do. |
| N-allyl-4-methylthio-4'-isothiocyano-diphenylamine | 150 | do | do | 0-0-0-0 | Do. |
| 4-isothiocyanodiphenylamine | 75 | do | do | 0-0-0-0 | Do. |
| 3-chloro-4'-isothiocyano-diphenylamine | 100 | do | do | 0-0-0-0 | Do. |
| 3-nitro-4'-isothiocyano-diphenylamine | 200 | do | do | 0-0-0-2 | Do. |
| 4-dimethylamino-4'-isothiocyano-diphenylamine | 100 | do | do | 0-0-0-0 | Do. |
| 3,4-dimethyl-4'-isothiocyano-diphenylamine | 200 | do | do | 0-0-0-0 | Do. |

Tests on mice infested with mouse oxyuridae

The active substance was administered via an esophagal syringe in the form of a suspension to white mice which had been infested with mouse oxyuridae. 5 animals were used for each test. The active substances were administered to each test animal once daily for three consecutive days. The animals were then killed on the 8th day after treatment had begun, and dissected.

The results were evaluated after dissection of the test animals by counting the number of mouse oxyuridae in the intestines. Untreated mice which had been infested in the same manner served as controls.

The agents were tolerated by the mice without any symptoms.

EXAMPLE 2

A solution of 19.8 parts of 3-methyl-4'-aminodiphenylamine in 300 parts by volume of ether is added dropwise to an emulsion of 12.6 parts of thiophosgene in 150 parts by volume of ice water. After stirring for 8 hours at room temperature, the layers are separated, the organic phase is dried over potassium carbonate, filtered, concentrated, and the oil remaining is distilled in high vacuum. 11 parts of 3-methyl-4'-isothiocyanodiphenylamine, b.p. 169–173°/0.002 Torr, distill.

EXAMPLE 3

At —10°, first 68 parts by volume of absolute triethyl-

| Active substance | Daily dosage, mg./kg. body weight | Length of administration in days | Infestation of— | |
| --- | --- | --- | --- | --- |
| | | | The 5 test animals at dissection | The control animals at dissection |
| 3-methyl-4'-isothiocyano-diphenylamine | 500 | 3 | 0-0-0-0-0 | 5/Ll-7/L-20/l-0/L-8/Ll |
| 4-nitro-4'-isothiocyano-diphenylamine | 750 | 3 | 0-0-0-0-0 | 9/Ll-25/Ll-0/L-0/L-4/Ll |
| 4-methyl-4'-isothiocyano-diphenylamine | 750 | 3 | 0-0-0-0-0 | 2-4-0-3/L-12/L |
| 4-tert-butyl-4'-isothiocyano-diphenylamine | 750 | 3 | 0-0-0-0-0 | 2-4-0-3/L-12/L |
| 4-methyl-3'-isothiocyano-diphenylamine | 750 | 3 | 0-0-0-0-0 | 2-4-0-3/L-12/L |
| 4-chloro-4'-isothiocyano-diphenylamine | 750 | 3 | 0-0-0-0-0 | 12/Ll-4/1-0-9-4/L |
| 4-methoxy-4'-isothiocyano-diphenylamine | 750 | 1 | 0-0-0-0-0 | 4-7-12-10-24 |
| 2-carbomethoxy-3'-isothiocyano-diphenylamine | 750 | 3 | 0-0-0-0-0 | 4/L-4/Ll-5/Ll-7/Ll-4/Ll |
| 4-methylthio-3'-isothiocyano-diphenylamine | 750 | 3 | 0-0-0-0-0 | 82/l-36/l-45/l-5/l-4/Ll |
| 4-methylthio-4'-isothiocyano-diphenylamine | 750 | 3 | 0-0-0-0-0 | 82/l-36/l-45/l-5/l-4/Ll |
| 3-chloro-4'-isothiocyano-diphenylamine | 500 | 3 | 0-0-0-0-0 | 0-0/L-2-1-1 |
| 3-nitro-4'-isothiocyano-diphenylamine | 750 | 3 | 0-0-0-0-0 | 3/Ll-3/l-0-8/l |
| 4-acetamido-3'-isothiocyano-diphenylamine | 750 | 3 | 0-2L-3-0-0 | 3/Ll-3/l-0-8/1 |
| 3,4'-diisothiocyano-diphenylamine | 750 | 3 | 0-0-0-2L-0 | 3/Ll-2/l-0-8/l |
| N-n-propyl-4-methoxy-4'-isothiocyano-diphenylamine | 750 | 3 | 0-0-0-0-0 | 4/L-4/Ll-5/Ll-7/Ll-4/Ll |
| N-allyl-4-methoxy-4'-isothiocyano-diphenylamine | 750 | 3 | 0-0-0-0-0 | 4/L-4/Ll-5/Ll-7/Ll-4/Ll |
| N-allyl-4-chloro-4'-isothiocyano-diphenylamine | 750 | 3 | 0-0-0-0-10l | 4/L-4/Ll-5/Ll-7/Ll-4/Ll |
| N-n-propyl-3-methoxy-4'-isothiocyano-diphenylamine | 750 | 3 | 0-0-0-0-1L | 15/Ll-20/L-28/Ll-60/L-40 |
| 4-ethyl-4'-isothiocyano-diphenylamine | 250 | 3 | 0-0-0-0-0 | 15/Ll-20/L-28/Ll-60/L-40 |
| 3,4-dimethyl-4'-isothiocyano-diphenylamine | 750 | 3 | 0-0-0-0-0 | 15/Ll-20/L-28/Ll-60/L-40 |
| 4-allyloxy-4'-isothiocyano-diphenylamine | 750 | 3 | 0-0-0-0-0 | 15/Ll-20/L-28/Ll-60L/40 |
| 3-trifluoromethyl-4-chloro-4'-isothiocyano-diphenylamine | 750 | 3 | 0-0-0-0-0 | 8-10-11-12-13/l |
| 4-bromo-4'-isothiocyano-diphenylamine | 750 | 3 | 0-0-0-0-0 | 4/Ll/5/Ll-7/Ll-12/Ll-24/Ll |
| 4-methoxy-3'-isothiocyano-diphenylamine | 750 | 3 | 0-0-0-0-0 | 3/L-12/L-15/L-16/Ll-28/Ll |

NOTE.—L=presence of old larvae; l=presence of young larvae.

The following examples illustrate the process according to the invention. Where not stated otherwise, "parts" are expressed by weight. The temperatures are given in degrees centigrade.

EXAMPLE 1

A solution of 16.1 parts of 4-chloro-4'-aminodiphenylamine in 100 parts by volume of dioxane is added dropwise to an emulsion of 9.6 parts of thiophosgene in 100 parts by volume of ice water, and stirred for 14 hours at room temperature. The resulting precipitate is washed well with water, and after drying in vacuo is recrystallized from ether/petroleum ether. 14 parts of 4-chloro-4'-isothiocyano-diphenylamine, m.p. 110–112°, are obtained.

amine and then 9.7 parts by volume of carbon dioxide are added dropwise, in such a manner that the internal temperature does not exceed 0°, to 32 parts of 4-methyl-4'-aminodiphenylamine in 80 parts by volume of absolute ether.

After stirring for 18 hours at room temperature, 15.1 parts by volume of phosphoroxy chloride in 18 parts by volume of absolute ether are added dropwise. (Internal temperature 0 to 10°, time of addition: 45 min.) Stirring is then continued for another 18 hours, the ethereal solution is decanted, and the residue is extracted 3 more times with 100 parts by volume each of ether. The combined ether extracts are concentrated and the remaining 4- methyl-4'-isothiocyano-diphenylamine distills at 181–183°/0.02 Torr. Melting point of the distilled product: 64–66°.

EXAMPLE 4

44 parts of thiophosgene in 50 parts by volume of chloroform are added dropwise to a solution of 73 parts of 4-methylthio-4'-aminodiphenylamine in 300 parts by volume of chloroform and 63.5 parts of sodium bicarbonate in 1000 parts by volume of water. After completion of the addition, stirring is continued for 6 hours at room temperature, the layers are separated, the chloroform solution is dried over magnesium sulfate, filtered and concentrated. The residue is dissolved in alcohol, and the 4-methylthio-4'-isothiocyano-diphenylamine, m.p. 87–91°, is precipitated by the addition of water. Yield: 65 parts.

EXAMPLE 5

24.4 parts of thiophosgene in 250 parts by volume of ether are added dropwise to a well-stirred suspension of 39 parts of 4-hydroxy-4'-amino-diphenylamine and 40 parts of sodium bicarbonate in 200 parts by volume of ice water. After completion of the addition, stirring is continued for 8 hours at room temperature, the layers are then separated, the organic phase is dried with calcium chloride, filtered and concentrated. The residue is recrystallized from toluene. 16.8 parts of 4-hydroxy-4'-isothiocyano-diphenylamine, m.p. 118–120°, are obtained. 12.8 parts thereof are refluxed with 7.5 parts of potassium carbonate in 40 parts by volume of acetone for 30 minutes with stirring; then 15.2 parts of allyl bromide are added dropwise with cooling. After refluxing for 18 hours, the reaction mixture is filtered, the filtrate is completely concentrated, and the residue is recrystallized from ether/petroleum ether to which animal charcoal has been added. 11 parts of 4-allyloxy-4'-isothiocyano-diphenylamine, m.p. 62–64°, are obtained.

EXAMPLE 6

7.4 Parts of benzoyl chloride are added dropwise to a solution of 4 parts of ammonium thiocyanate in 20 parts by volume of acetone. The mixture is refluxed and, while hot, treated with a solution of 11.5 parts of 4'-amino-4-methylthio-diphenylamine in 20 parts by volume of acetone. The reaction mixture is then poured with stirring into 300 parts by volume of water, and treated with 150 parts by volume of 30% aqueous sodium hydroxide solution, and then refluxed. After the mixture has cooled, it is neutralized with hydrochloric acid, while cooling with ice, and the resulting precipitate is removed by suction. The resulting 1 - N - (4'-methylthiophenyl)-4-amino-phenyl-thiourea is dried and then refluxed for 10 hours in 100 parts by volume of chlorobenzene. The solvent is then removed by distillation and the residue is recrystallized from ethanol/water. The 4'-isothiocyano-4-methylthio-diphenylamine has a melting point of 87–91°. The mixed melting point with the compound obtained according to Example 4 shows no depression.

EXAMPLE 7

(a) 17.7 Parts of 4-nitro-4'-aminodiphenylamine in 200 parts by volume of ice water are treated with 9.7 parts of thiophosgene and stirred for 12 hours at room temperature. The resulting dark yellow precipitate is separated by filtration, dried in vacuum at 70° and recrystallized from acetone. 11.7 Parts of 4-nitro-4'-isothiocyano-diphenylamine, m.p. 204–206°, are obtained.

(b) A suspension of 29.9 parts of 4-nitro-4'-aminodiphenylamine and 30.7 parts of bis-diethyl-thiocarbamoyl disulfide (tetraethyl thiuramdisulfide) in 500 parts by volume of chlorobenzene is saturated with hydrogen chloride gas at room temperature, while excluding atmospheric moisture; then it is stirred for 4 hours at reflux, filtered hot, the separated warm organic layer is extracted with warm water, then dried over calcium chloride, filtered and concentrated. The crystalline residue is recrystallized from acetone/toluene to which animal charcoal has been added, whereby 10 parts of 4 - nitro-4'-isothiocyano-diphenylamine, m.p. 202–205, are obtained. The mixed melting point with a sample of the substance obtained according to (a) shows no depression.

(c) 11.45 Parts of 4-nitro-4'-aminodiphenylamine and 7.95 parts of N,N-diethyl-thiocarbamoyl chloride are refluxed for 6.5 hours with 150 parts by volume of chlorobenzene. After removal of the solvent by distillation, the crystalline residue is dispersed in ethyl acetate/water, the layers are separated, the organic extract is dried over potassium carbonate, filtered and concentrated. The crystalline residue which remains is recrystallized according to Example 6 b) from acetone/toluene, whereby 5.1 parts of 4-nitro-4'-isothiocyano-diphenylamine having identical melting point and mixed melting point, are obtained.

(d) A solution of 11.5 parts of 4-nitro-4'-amino-diphenylamine in 100 parts by volume of chlorobenzene (anhydrous) is saturated with dry hydrogen chloride gas, then treated with 5 parts of ammonium thiocyanate and refluxed for 6 hours with continual introduction of hydrogen chloride gas. The undissolved portions are removed by filtration and the filtrate is concentrated to dryness in vacuum. The crystalline residue is recrystallized from acetone/toluene. The 4-nitro-4'-isothiocyano-diphenylamine, m.p. 204–206°, is obtained; the mixed melting point with the substance obtained according to (a) shows no depression.

EXAMPLE 8

46 Parts of 4-methoxy-4'-nitro-diphenylamine are refluxed for 15 minutes while stirring with 40 parts of finely pulverized potassium hydroxide in 400 parts by voulme of acetone. A solution of 26.6 parts of allyl bromide in 35 parts by volume of acetone is then carefully added dropwise at room temperature. Then the mixture is refluxed for 90 minutes while stirring and subsequently concentrated by evaporation. The residue is digested with water, filtered and, after drying, recrystallized from ethyl acetate/petroleum ether. 55 Parts of N-allyl-4-methoxy-4'-nitro-diphenylamine, m.p. 81–82°, are obtained, which are reduced in dioxane with Raney nickel to N-n-propyl-4-methoxy-4'-amino-diphenylamine.

13 Parts of the latter product in 200 parts by volume of ether are added dropwise to an emulsion of 6.5 parts of thiophosgene in 100 parts by volume of ice water. After completion of the addition, the mixture is stirred for 8 hours at room temperature. The organic phase is separated, dried over potassium carbonate, filtered, concentrated by evaporation, and the remaining oil is distilled under high vacuum. The resulting N-n-propyl-4-methoxy-4'-isothiocyano-diphenylamine has a boiling point of 185–188°/0.1 Torr.

EXAMPLE 9

23 Parts of 4-methoxy-4'-nitro-diphenylamine are refluxed for 15 minutes while stirring with 20 parts of finely pulverized potassium hydroxide in 200 parts by volume of acetone. 30 Parts by volume of dimethyl sulfate are carefully added dropwise at room temperature, and the reaction mixture is refluxed for 90 minutes while stirring and then concentrated by evaporation. The residual N-methyl-4-methoxy-4'-nitro-diphenylamine, which after recrystallization has a melting point of 125–126° is reduced in dioxane with Raney nickel to N-methyl-4-methoxy-4'-amino-diphenylamine, m.p. 76–79°. 11 Parts of the latter in 200 parts by volume of ether are added dropwise to an emulsion of 6.5 parts of thiophosgene in 100 parts by volume of ice water. After completion of the addition, the mixture is stirred for 8 hours at room temperature. The organic phase is separated, dried over potassium carbonate, filtered and concentrated by evaporation. The residual N-methyl - 4 - methoxy-4'-isothiocyano-diphenylamine has, after recrystallization from benzene/petroleum ether a melting point of 73–75°.

The following isothiocyano-diphenylamines of the Formula I are also produced according to the preceding examples:

TABLE

| No. | Compound | Melting points, boiling points in °C., refraction indices |
|---|---|---|
| 10 | 3-chloro-4'-isothiocyano-diphenylamine | 86. |
| 11 | 4-methyl-3-isothiocyano-diphenylamine | 161–163. |
| 12 | 4-tert-butyl-4'-isothiocyano-diphenylamine | 80–82. |
| 13 | 2-nitro-4'-isothiocyano-diphenylamine | 158–159. |
| 14 | 3-nitro-4'-isothiocyano-diphenylamine | 117. |
| 15 | 4-nitro-3'-isothiocyano-diphenylamine | 140–142. |
| 16 | 2,4-dinitro-4'-isothiocyano-diphenylamine | 134–136. |
| 17 | 2,4-dinitro-3'-isothiocyano-diphenylamine | 145–147. |
| 18 | 4-methyl-4'-nitro-3'-isothiocyano-diphenylamine | 168–170. |
| 19 | 4-methylthio-3'-isothiocyano-diphenylamine | 180–185/0.005 torr. |
| 20 | 2-carboxy-4'-isothiocyano-diphenylamine | 196–197. |
| 21 | 2-carboxy-3'-isothiocyano-diphenylamine | 183–185. |
| 22 | 2-carboxy-5-isothiocyano-diphenylamine | 201–203. |
| 23 | 4-chloro-2'-carboxy-4'-isothiocyano-diphenylamine | 220–222. |
| 24 | 4-methoxy-2'-carboxy-3'-isothiocyano-diphenylamine | 198–203. |
| 25 | 4-methoxy-2'-carboxy-4'-isothiocyano-diphenylamine | 183–185. |
| 26 | 4-acetylamino-4'-isothiocyano-diphenylamine | 164–165. |
| 27 | 4-acetylamino-3'-isothiocyano-diphenylamine | 152–155. |
| 28 | 2-carbomethoxy-4'-isothiocyano-diphenylamine | 95–98. |
| 29 | 2-carbomethoxy-3'-isothiocyano-diphenylamine | 45–47. |
| 30 | 3,4'-diisothiocyano-diphenylamine | 108–111. |
| 31 | 4-dimethylamino-4'-isothiocyano-diphenylamine | 115–120. |
| 32 | 3-trifluoromethyl-3'-isothiocyano-diphenylamine | 156–160/0.2 torr. |
| 33 | 4-trimethylammonio-4'-isothiocyano-diphenylamineiodide | 186–189. |
| 34 | 3-trifluoromethyl-4-chloro-4'-isothiocyano-diphenylamine | 87–92. |
| 35 | 3,4-dimethyl-4'-isothiocyano-diphenylamine | 92–93. |
| 36 | 4-hydroxy-4'-isothiocyano-diphenylamine | 118–120. |
| 37 | 3-isothiocyano-diphenylamine | 212/0.1 torr. |
| 38 | 4-isothiocyano-diphenylamine | 73–74. |
| 39 | 4-methoxy-4'-isothiocyano-diphenylamine | 55–57. |
| 40 | 4-methoxy-2'-carboxy-5'-isothiocyano-diphenylamine | 198–203. |
| 41 | 4-bromo-4'-isothiocyano-diphenylamine | 111–114. |
| 42 | 4-valeryl-4'-isothiocyano-diphenylamine | 132–135. |
| 43 | 4-cyano-4'-isothiocyano-diphenylamine | 185–186. |
| 44 | 4-dimethylaminoethoxy-4'-isothiocyano-diphenylamine | 117–120. |
| 45 | 3-trifluoromethyl-4'-isothiocyano-diphenylamine | 77–79. |
| 46 | N-allyl-4-chloro-4'-isothiocyano-diphenylamine | 179–181. |
| 47 | N-allyl-4-methyl-4'-isothiocyano-diphenylamine | $n_D^{20}$ 1.6742. |
| 48 | N-n-propyl-3-methoxy-4'-isothiocyano-diphenylamine | Oil. |
| 49 | N-allyl-4-methylthio-4'-isothiocyano-diphenylamine | 175/0.001 torr. |
| 50 | N-allyl-4-methoxy-4'-isothiocyano-diphenylamine | $n_D^{20}$ 1.6571. |
| 51 | N-methyl-4-methoxy-4'-isothiocyano-diphenylamine | 73–78. |
| 52 | N-n-propyl-4-methoxy-4'-isothiocyano-diphenylamine | 185–188/0.1 torr. |
| 53 | 4-methylthio-3'-isothiocyano-diphenylamine | 180–185/0.005 torr. |
| 54 | 3-methoxy-4'-isothiocyano-diphenylamine | 63–65. |
| 55 | 4-methoxy-3'-isothiocyano-diphenylamine | 59–61. |
| 56 | 4-ethyl-4'-isothiocyano-diphenylamine | 180–182/0.1 torr. |
| 57 | 2-carbopropoxy-3'-isothiocyano-diphenylamine | Oil. |
| 58 | 4-acetoxy-4'-isothiocyano-diphenylamine | 160–164. |
| 59 | 4-diethylaminoethoxy-4'-isothiocyano-diphenylamine | 169–173. |
| 60 | 4-n-amyl-4'-isothiocyano-diphenylamine | |
| 61 | 4-(1-pentenyl)-4'-isothiocyano-diphenylamine | |
| 62 | 4-allylthio-4'-isothiocyano-diphenylamine | |
| 63 | 4-(2''-dimethylaminoethyl)-4'-isothiocyano-diphenylamine | |
| 64 | 4-(3''-dimethylaminopropyl)-4'-isothiocyano-diphenylamine | |
| 65 | 4-dimethylamino-4'-isothiocyano-dipehnylamine hydrochloride | |
| 66 | 4-dimethylamino-4'-isothiocyano-diphenylamine p-toluene-sulfonate | |
| 67 | 4-diethylamino-4'-isothiocyano-diphenylamine sulfate | |
| 68 | 4-n-butylthio-4'-isothiocyano-diphenylamine | |
| 69 | 4-(2''-dimethylaminoethylthio)-4'-isothiocyano-diphenylamine | |
| 70 | 4-(3''-dimethylaminopropylthio)-4'-isothiocyano-diphenylamine | |
| 71 | 4-valeryloxy-4'-isothiocyano-diphenylamine | |
| 72 | 4,5'-dimethyl-3'-isothiocyano-diphenylamine | |

The following non limitative examples are given for the production of forms of application of anthelmintically effective veterinary-medical preparations and feed additives. Parts are given therein by weight.

EXAMPLE 73

A dispersible powder is produced by thoroughly milling and mixing 50 parts of 4-nitro-4'-isothiocyano-diphenylamine, 1 part of a condensation product obtained from ethylene oxide and the condensation product of propylene oxide and propylene glycol having a molecular weight of about 2000 (e.g. the commercially available "Pluronic L 61"), 5 parts of the ammonium salt of a sulfonated naphthalene sulfonic acid-phenol-formaldehyde condensate (e.g. the commercially available "Irgatan AG 1") and 44 parts of kaolin.

A dispersable powder is also obtained when 50 parts of 4-chloro-4'-isothiocyano-diphenylamine, 1 part of a condensation product obtained from ethylene oxide and the condensation product of propylene oxide and propylene glycol having a molecular weight of about 8000 (e.g. the commercially available "Pluronic F 68"), 0.5 parts of sodium lignin sulfonate and 48.5 parts of sodium aluminium silicate are used.

These dispersible powders can be mixed with liquid or pulpy feeds for administration to pets and domestic animals.

EXAMPLE 74

2 Parts of 4-nitro - 4' - isothiocyano-diphenylamine are thoroughly mixed with 2 parts of a condensation product obtained from ethylene oxide and the condensation product of propylene oxide and propylene glycol (e.g. the commercially available "Pluronic L 64") and 96 parts of glycolmonoethyl ether to form an emulsion concentrate which can be dispersed in any concentration desired, e.g. in water or milk for administration to pets and domestic animals.

EXAMPLE 75

40 Parts of 4-methyl - 4' - isothiocyano-diphenylamine are thoroughly mixed with 2.5 parts of sodium lignin sulfonate, 0.3 parts of sodium benzoate, 10 parts of glycerol and 47.2 parts of distilled water to form a paste, which can be mixed with liquid or pulpy feeds for administration to pets and domestic animals.

EXAMPLE 76

35 Parts of 4-nitro - 4' - isothiocyano-diphenylamine are thoroughly mixed with 15 parts of molasses, 5 parts of pulverized liquorice, 25 parts of pulverised hay and 20 parts of ground bran. The obtained mixture is shaped by means of a press into briquets which can be added to the feed.

In the above Examples 73 to 76 the active substance of Formula I can be replaced by any of the compounds disclosed in the Examples 1 to 9 or in the table.

We claim:

1. An anthelmintic composition comprising an anthelmintically effective amount of a compound of the formula:

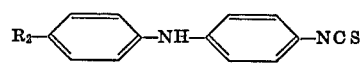

wherein $R_2$ is nitro, chlorine or methyl, and a carrier which is well tolerated by warm-blooded animals and compatible with said compound.

2. A method for controlling helminths infesting a warm-blooded animal which comprises orally administering to an animal in need of anthelmintic treatment an anthelmintically effective amount of a compound of the formula

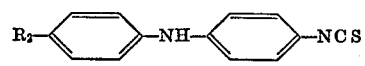

wherein $R_2$ is nitro, chlorine or methyl.

3. A method as defined in Claim 2, wherein said compound is 4-nitro-4'-isothiocyano-diphenylamine.

4. A method as defined in Claim 2, wherein said compound is 4-methyl-4'-isothiocyano-diphenylamine.

5. A method as defined in Claim 2, wherein said compound is 4-chloro-4'-isothiocyano-diphenylamine.

References Cited
UNITED STATES PATENTS

| | | | |
|---|---|---|---|
| 3,558,784 | 1/1971 | Paltauf et al. | 260—454 |
| 3,366,538 | 1/1968 | Werres et al. | 424—302 |
| 3,471,576 | 10/1969 | Klesper et al. | 424—337 |
| 3,285,730 | 11/1966 | Weis et al. | 260—454 |
| 3,098,006 | 7/1963 | Soder et al. | 424—302 |
| 2,059,800 | 11/1936 | Laska et al. | 260—576 |
| 2,572,067 | 10/1951 | Smith | 260—576 |
| 3,248,427 | 4/1966 | Greenfield | 260—576 |
| 3,277,175 | 10/1966 | Clemens, Jr. | 260—576 |
| 3,367,957 | 2/1968 | Newallis et al. | 260—454 |

FOREIGN PATENTS

| | | | |
|---|---|---|---|
| 793,802 | 4/1958 | Great Britain | 260—454 |
| 1,024,913 | 4/1966 | Great Britain | 260—454 |
| 1,099,768 | 1/1968 | Great Britain | 260—454 |

OTHER REFERENCES

Cymerman-Craig et al., Chemical Abstracts 55:19032–33 (1961).

Anthoni et al., Chemical Abstracts 67:99764 (1967).

Banchetti, Chemical Abstracts 50:15949 (1956).

Van Esch, Chemical Abstracts 54:21451 (1960).

Mackie et al., J. Pharm. & Pharmacol., vol. 7, p. 616 (1955).

ALBERT T. MEYERS, Primary Examiner

N. A. DREZIN, Assistant Examiner

UNITED STATES PATENT OFFICE
CERTIFICATE OF CORRECTION

Patent No. 3,839,582        Dated October 1, 1974

Inventor(s) Paul Brenneisen et al.

It is certified that error appears in the above-identified patent and that said Letters Patent are hereby corrected as shown below:

The following should be inserted in the Heading:

Claims priority, Swiss application No. 10482/68, July 12, 1968.

Signed and sealed this 28th day of January 1975.

(SEAL)
Attest:

McCOY M. GIBSON JR.                C. MARSHALL DANN
Attesting Officer                  Commissioner of Patents